United States Patent [19]

Grimes et al.

[11] 4,365,034

[45] Dec. 21, 1982

[54] ACETYLENE-TERMINATED POLYIMIDE COMPOSITIONS

[75] Inventors: Mark F. Grimes, Springfield; Theodore J. Reinhart, Jr., Dayton, both of Ohio

[73] Assignee: The United States of America as represented by the Secretary of the Air Force, Washington, D.C.

[21] Appl. No.: 304,126

[22] Filed: Sep. 21, 1981

[51] Int. Cl.$^3$ .............................................. C08G 73/12
[52] U.S. Cl. .................................... 524/256; 524/254; 524/255; 524/300; 524/321; 524/347; 525/421; 525/426; 525/436; 526/259; 526/285; 528/125
[58] Field of Search ...................... 525/1, 6, 421, 426, 525/436; 528/125, 177; 526/259, 285; 524/300, 321, 254, 255, 256, 347

[56] References Cited

U.S. PATENT DOCUMENTS

| | | | |
|---|---|---|---|
| 3,845,018 | 10/1974 | Bilow et al. | 528/178 |
| 3,864,309 | 2/1975 | Bilow et al. | 528/178 |
| 3,897,395 | 7/1975 | D'Alelio | 528/178 |
| 4,098,767 | 7/1978 | Bilow | 528/178 |
| 4,187,359 | 2/1980 | Picklesimer et al. | 525/6 |

Primary Examiner—Lester L. Lee
Attorney, Agent, or Firm—Donald J. Singer; William J. O'Brien

[57] ABSTRACT

A composition of matter comprising an acetylene-terminated polyimide oligomer and a cure rate inhibitor selected from the group consisting of hydroquinone, maleic acid, glutaric acid, dibetanapthyl para-phenylene diamine. The composition has a retarded cure rate, thereby facilitating the fabrication of void-free molded objects and composites.

3 Claims, No Drawings

ACETYLENE-TERMINATED POLYIMIDE COMPOSITIONS

STATEMENT OF GOVERNMENT INTEREST

The invention described herein may be manufactured and used by or for the Government for governmental purposes without the payment of any royalty thereon.

FIELD OF THE INVENTION

This invention relates to acetylene-terminated polyimide compositions which have a retarded rate of cure. More particularly, it relates to a process for retarding the rate of cure of acetylene-terminated polyimide oligomers through the addition of a chemical inhibitor to the polyimide composition to retard its rate of cure.

BACKGROUND OF THE INVENTION

Acetylene-terminated polyimide oligomers show promise as matrix resins for advanced aircraft and aerospace systems. The materials have the potential of curing without the evolution of volatile by-products, thereby obviating the problem of voids formation in composite structures and molded articles. Unfortunately, the acetylene-terminated oligomers generally display a very narrow processing window as a result of a comparatively rapid gel formation at cure temperatures. For example, gel times of 1 to 3 minutes at cure temperature of about 485° F. are not unusual. Because of the short flow period before gelation occurs, it becomes necessary to control processing parameters very closely, thereby causing difficulties in the fabrication of fiber reinforced composites, adhesives in bonded joints and in injection or compression molded components or parts. In Application Ser. No. 967,049, filed on Dec. 6, 1979, now U.S. Pat. No. 4,187,359 issued Feb. 5, 1980, it is disclosed by one of us as a coinventor that trinitroloacetonitrile is an effective additive for retarding the rate of cure of acetylene-terminated polyimide oligomers. It would be desirable to provide other compounds that would have a similar effect when added to the oligomers.

It is an object of this invention, therefore, to provide additives for acetylene-terminated polyimide oligomers that retard their rate of cure.

Another object of the invention is to provide acetylene-terminated polyimide oligomer compositions having a retarded cure rate as compared to the oligomer per se.

Another object of the invention is to provide a method for retarding the rate of cure of acetylene-terminated polyimide oligomers.

Other objects and advantages of the invention will become apparent to those skilled in the art upon consideration of the accompanying disclosure.

SUMMARY OF THE INVENTION

The present invention resides in the discovery that the addition of a minor amount of hydroquinone, maleic acid, dibetanapthyl para-phenylene diamine, or glutaric acid to an acetylene-terminated polyimide oligomer inhibits or retards the rate of cure of the oligomer. Broadly speaking, the composition of this invention comprises a major amount of an acetylene-terminated polyimide oligomer and a minor amount of either hydroquinone, maleic acid, dibetanapthyl para-phenylene diamine or glutaric acid as a curing rate additive. A preferred composition is one consisting essentially of the acetylene-terminated polyimide oligomer and from about one to 20 weight percent of the additive based upon the weight of the polyimide oligomer.

DETAILED DESCRIPTION OF THE PREFERRED EMBODIMENT

The compositions of this invention are prepared by blending the polyimide oligomer and one of the additives, both of which are in solid form, so as to provide an intimate mixture of the materials. The mixing of small amounts is usually accomplished by grinding the materials in a mortar while mixing apparatus, such as a Banbury mixer, can be utilized to blend larger quantities. In a preferred procedure, the materials are added to acetone and then stirred until the acetone is evaporated. Intermittent stirring over a period of about 1 to 8 hours is usually sufficient to complete the evaporation and leave a homogeneous mixture of the polyimide oligomer and the additive.

Acetylene-terminated polyimide oligomers are well known materials that are described in the literature. While the present invention is applicable to acetylene-terminated polyimide oligomers generally, it is often preferred to utilize an oligomer having the following structural formula:

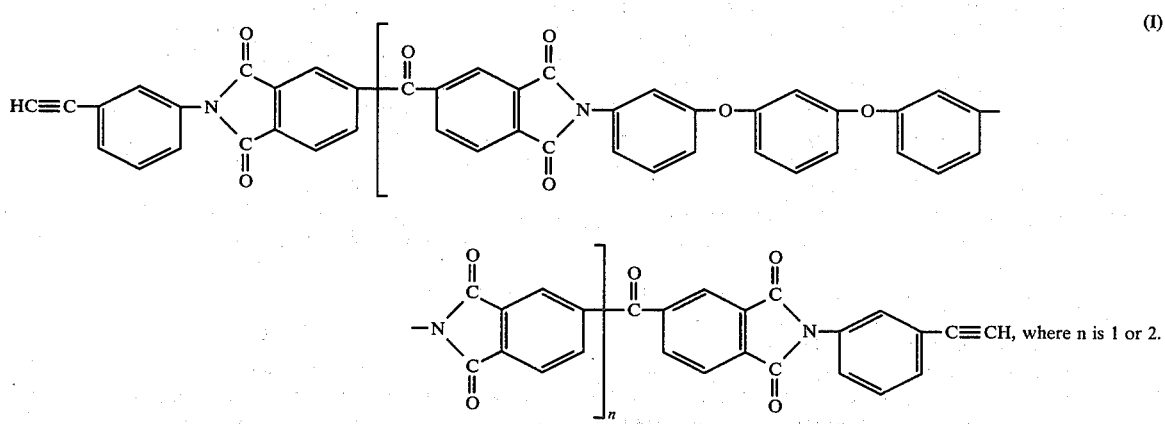

The polyimide oligomers according to the foregoing formula are prepared as described in U.S. Pat. No. 3,845,018, issued to Bilow et al on Oct. 29, 1974. The oligomers are also disclosed in U.S. Pat. Nos. 3,864,309 and 3,879,349, which also issued to Bilow et al.

The compositions of this invention are particularly useful in making objects or articles by compression molding. In a preferred molding procedure one of the herein disclosed compositions is placed in a mold and heated for 1 hour at about 480° F. under a pressure of 250 psi. During this period the composition is converted to a liquid state and remains in that state for about 10 to 15 minutes. By remaining in the liquid state, any residual solvent present in the polyimide oligomer and any air in the mold are able to escape, thereby preventing the formation of voids and cracks in the molded product. In contrast to this desirable result, when the acetylene-terminated polyimide oligomer per se is used as the molding material, the oligomer gels within about 1 to 3 minutes, entrapping any residual solvent and air. As a result, the molded article contains voids and cracks.

After the initial heating period at 420° F. under a pressure of 250 psi, the pressure is increased to 1500 psi and held at that pressure for 45 minutes. While still at a pressure of 1500 psi, the temperature is raised to 600° F. at the rate of 25° F. per 5 minute intervals. The temperature and pressure are maintained at 600° F. and 1500 psi for 45 minutes in postcuring the molding composition. The molded composition is then allowed to cool to room temperature while under a pressure of 1500 psi prior to its removal from the mold.

The compositions of this invention also can be employed in the fabrication of composite structures. In one procedure, a sample of one of the compositions is spread in measured amounts on successive layers of glass cloth. The multi-ply laminate is then molded under the conditions specified in the preceding paragraph. A molded composite free of voids is thereby obtained.

As intimated above, the present composition melts when intially heated at about 480° F. and remains in a fluid, flowable state for an extended period of time. This retardation in the rate of cure greatly extends the processing window of the polyimide oligomer, thereby facilitating the cure procedure and ensuring the production of a product free of voids and cracks. While it is not intended to limit the present invention to any particular theory since the actual mechanisms by which the cure retarding additives retard the cure of the acetylene-terminated polyimides are not known, it is believed that the acidic or labil hydrogen of the terminated acetylene groups of the polyimide resin can be bound in a complex and that the gelation of the polyimide is thus delayed extending the processing window. As a result, the acetylene groups are unable to react and the composition melts and remains in a fluid state. However, because of the instability of the complex at higher temperatures, the complex subsequently breaks down, freeing the acetylene end groups and permitting the polyimide oligomers to propagate and cure by addition reactions to form high molecular weight, thermally stable products.

As stated heretofore, the invention involves the addition of chemical inhibitors to Thermid 600 acetylene terminated polyimide resins in order to retard the rate or cure of the acetylene end groups during processing of the resin into fiber reinforced composites, adhesives in bonded joints or into injection or compression molded parts or components. A very narrow processing window is normally exhibited by Thermid 600 acetylene terminated polymers with common gel times of approximately 3 minutes at cure temperatures of 480° F. This relatively short flow period makes necessary very close control of processing parameters, as the material is not very forgiving of mistakes during the cure process. The addition of chemical compounds having the ability to retard or inhibit the reaction of the terminal acetylene groups for some period of time greatly increases the processing window of the Thermid 600.

As stated heretofore, it was discovered that the addition of hydroquinone, maleic acid, dibetanapthyl para-phenylene diamine, or glutaric acid in the amounts from about 1% to 20% by weight causes cure retardation of the resin such that the gle time at 480° F. is between 8 and 16 minutes, after which period the resin cures normally. Besides increasing the processing window, the addition of these cure retarding materials serves to lower the cost of the Thermid 600 mixture.

A more comprehensive understanding of the invention can be obtained by referring to the following illustrative examples which are not intended, however, to be unduly limitative of the invention.

EXAMPLE I

A run was conducted in which mixtures containing the acetylene-terminated polyimide oligomer and one, 5, 10 and 20 weight percent of the hydroquinone and maleic acid additives, respectively, based upon the weight of the oligomer, were prepared. The polyimide oligomer used is a product of Gulf Chemicals Co. sold under the trademark Thermid 600 and has the structure shown by formula (I) in which n equals 1. In preparing the mixture, the Thermid 600 oligomer and additive were ground in a mortar until an intimate admixture was obtained.

Samples of the 5 percent mixtures were placed on a hot plate whose temperature was then raised to 480° F. at a rate of about 10° F. per minute. The mixtures melted and had a processing window of about 9 minutes. After cooling, the mixtures were glassy beads.

In a control run, a sample of Thermid 600 oligomer alone was heated in the same manner as described in the preceding paragraph. The oligomer exhibited a flow time of only 3 minutes.

EXAMPLE II

Runs were also conducted using mixtures of Thermid 600 and one percent, 5 percent, 10 percent and 20 percent by weight of the glutaric acid additive and the dibetanaphthyl para-phenylene diamine additive, respectively, all of which were prepared in the same manner as the mixtures of Example I. These mixtures were also dropped on a hot plate preheated to 480° F. While pure Thermid 600 exhibited a flow time of only 3 minutes, the mixtures of this example showed a substantial increase in flow time. For example, the 5 percent dibetanaphthyl para-phenylene diamine showed one of approximately 8 minutes and the 5 percent glutaric acid mixture had a processing window of about 9.5 minutes. Ten percent and 20 percent mixtures showed an even larger processing window of up to 16.5 minutes.

EXAMPLE III

Runs were conducted in which $3'' \times \frac{1}{2}'' \times \frac{1}{4}''$ bar specimens were prepared by compression molding mixtures consisting of Thermid 600 oligomer and 10 and 20 weight percent of the additives of this invention. The mixtures were prepared by adding the materials to acetone and stirring the materials intermittently until the acetone had evaporated, leaving homogenous mixtures. In preparing each specimen, 8.4 g of the mixture was added to a mold which had been sprayed with a fluorocarbon release agent. A hydraulic press was preheated to 480° F. and the mold was placed in the press and held at 480° F. and 250 psi for 1.5 hours. The pressure was then increased to 1000 psi and held for 1 hour. The mold was then allowed to cool to room temperature while under a pressure of 1000 psi after which the specimen was removed from the mold.

The specimens prepared as described above had advanced to a high degree of cure and were free of voids and cracks. However, since the ends of the specimens were slightly uncured, it was decided to use an increased pressure in subsequent runs as exemplified by those described hereinafter in Example IV.

Control runs were conducted in which it was attempted to form bar specimens from Thermid 600 alone by following the procedure described above. The specimens obtained either had large voids and cracks or the oligomer did not even flow, i.e., formed clumps in the mold.

EXAMPLE IV

Runs were conducted in which intimate mixtures consisting of Thermid 600 oligomer and 5 weight percent and 10 weight percent additive were prepared, following the procedure described in Example III. The mixtures were used to prepare $3'' \times \frac{1}{2}'' \times \frac{1}{4}''$ bar specimens by compression molding. In preparing each specimen, 8.4 g of mixture was added to a mold which had been sprayed with a fluorocarbon release agent. A hydraulic press was preheated to 480° F. and the mold was placed in the press and heated for 1 hour at 480° F. and 250 psi. The pressure was then raised to 1500 psi and held at that pressure for 45 minutes. The temperature was then raised to 600° F. at the rate of 25° F. per 5 minute intervals. The temperature and pressure were held at 600° F. and 1500 psi for 45 minutes after which the specimen was allowed to cool to room temperature with the pressure remaining at 1500 psi. Thereafter, in each run the specimen was removed from the mold.

The specimens obtained in the runs were completely cured and were free of voids and cracks. The presence of the additive in the mixture allowed the oligomer to stay in the fluid state after melting, thereby making it possible to form a uniform specimen. In control runs using Thermid 600 alone, the oligomer set up as soon as it melted so that the specimens obtained were invariably of poor quality.

As seen from the foregoing, the cure retarding inhibitor of this invention can be used to prepare acetylene-terminated polyimide oligomers which find special utility in the fabrication of molded objects which are free of voids and cracks. This desirable result is made possible by the presence in the mixture of one of the particular additives of this invention. These additives retard the rate of cure so that the oligomer remains in the liquid state for an extended period of time. The curing procedure is thereby simplified, making it possible to use lower pressures and eliminate the requirement of advancing the cure as is usually required for polyimide oligomers.

As will be evident to those skilled in the art, modification of the present invention can be made in view of the foregoing disclosure without departing from the spirit and scope of the invention.

We claim:

1. A composition of matter comprising a major amount of an acetylene-terminated polyimide oligomer and a minor amount of a cure rate inhibitor selected from the group consisting of hydroquinone maleic acid, glutaric acid, dibetanaphthyl para-phenylene diamine.

2. The composition of claim 1 which comprises the acetylene-terminated polyimide oligomer and about 1 to 20 weight percent of the cure rate inhibitor.

3. The composition according to claim 2 in which the acetylene-terminated polyimide oligomer has the following structural formula:

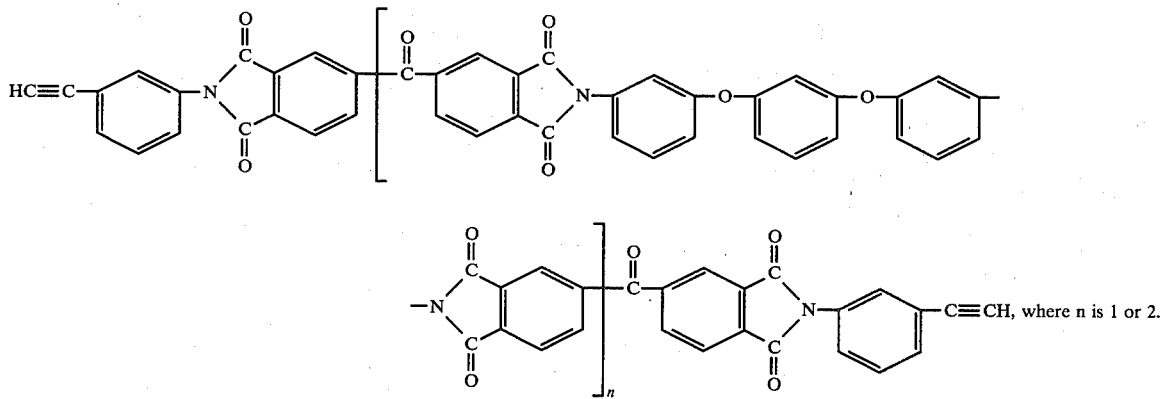

* * * * *